United States Patent [19]

Reynolds

[11] Patent Number: 5,710,593
[45] Date of Patent: Jan. 20, 1998

[54] SCH PHASE ADJUSTMENT FOR DIGITALLY SYNTHESIZED VIDEO TEST SIGNALS

[75] Inventor: John C. Reynolds, Beaverton, Oreg.

[73] Assignee: Tektronix, Inc., Wilsonville, Oreg.

[21] Appl. No.: 589,695

[22] Filed: Jan. 22, 1996

[51] Int. Cl.⁶ .................................................. H04N 17/00

[52] U.S. Cl. .................................................. 348/181; 348/194

[58] Field of Search .................................. 348/180, 181, 348/182, 183, 192, 194, 189; H04N 17/02, 17/04

[56] References Cited

U.S. PATENT DOCUMENTS

| | | | |
|---|---|---|---|
| 4,788,585 | 11/1988 | Suzuki | 348/194 |
| 5,001,549 | 3/1991 | Holmbo et al. | 348/182 |

*Primary Examiner*—John K. Peng
*Assistant Examiner*—Nathan J. Flynn
*Attorney, Agent, or Firm*—Francis I. Gray

[57] ABSTRACT

A digital test signal generator includes the ability to adjust the SCH phase of the output test signal. A color frame reset pulse is generated at the beginning of each color frame of the output test signal. The color frame reset pulse is input to a direct digital signal synthesizer together with an SCH phase adjust signal to initialize the synthesizer with an SCH phase offset at the beginning of each color frame. By varying the amount of the SCH phase offset, the SCH phase in the output test signal is varied.

4 Claims, 1 Drawing Sheet

SCH PHASE ADJUSTMENT FOR DIGITALLY SYNTHESIZED VIDEO TEST SIGNALS

BACKGROUND OF THE INVENTION

The present invention relates to test signal generation, and more particularly to a method and apparatus for adjusting the SCH phase of digitally synthesized video test signals.

In the NTSC and PAL composite video systems the color, or chrominance, information is modulated onto an in-band subcarrier. In each of these video systems a specific phase relationship between the unmodulated chrominance subcarrier and horizontal sync timing is required. This is commonly called the "subcarrier-to-horizontal phase" or simply "SCH phase." In particular the RS-170A specification for the NTSC video systems states:

"The zero crossings of reference subcarrier shall be nominally coincident with the 50% point of the leading edges of all horizontal sync pulses. For those cases where the relationship between sync and subcarrier is critical for program integration, the tolerance on this coincidence is ±45% of reference subcarrier."

The period of an NTSC signal consists of four fields (two frames), which is typically called a "color frame." For PAL the color frame is eight fields. When two or more video signals are to be combined, the color frame sequence of each signal should begin at exactly the same moment. To do this the equipment combining the video signals needs to uniquely identify each of the color fields in the color frame. Even and odd fields may be identified by simply measuring sync pulses during the vertical interval. However to distinguish field one from the other odd numbered fields in a color frame requires an SCH phase measurement. As stated in RS-170A for NTSC:

"Color field one is that field with positive going zero-crossings of reference subcarrier nominally coincident with 50% amplitude point of the leading edges of even number horizontal sync pulses." Hence any equipment used to combine or synchronously switch NTSC or PAL video signals should be able to properly determine the color field of signals with SCH phase errors of up to ±45%.

U.S. Pat. No. 5,159,435, issued Oct. 27, 1992 to Dennis Holmbo et al entitled "Television Signal Generator", describes a digital test signal generator that uses direct digital synthesis to generate video test signals without residual subcarrier and SCH errors in the output test signals. However this signal generator does not provide for a variable SCH phase, and so it is not useful in testing equipment with intentional phase errors up to ±45%.

What is desired is a direct digitally synthesized video source with a controllable, variable SCH phase capability to provide test signals for testing equipment with intentional phase errors up to ±45%.

SUMMARY OF THE INVENTION

Accordingly the present invention provides for SCH adjustment of digitally synthesized video test signals by modifying once per color frame of the video signals the phase used to initialize a phase accumulator in a quadrature direct digital signal synthesizer. A desired SCH phase offset is stored in an SCH phase register. A color frame reset pulse is generated for each color frame of the video test signals to switch the desired SCH phase offset to the input of a phase accumulator to initialize the accumulator with the intentional SCH phase error value. Varying the desired SCH phase offset allows adjustment of the SCH phase of the video test signals as desired.

The objects, advantages and other novel features of the present invention are apparent from the following detailed description when read in conjunction with the appended claims and attached drawing.

DESCRIPTION OF THE PREFERRED EMBODIMENT

Figure 1:
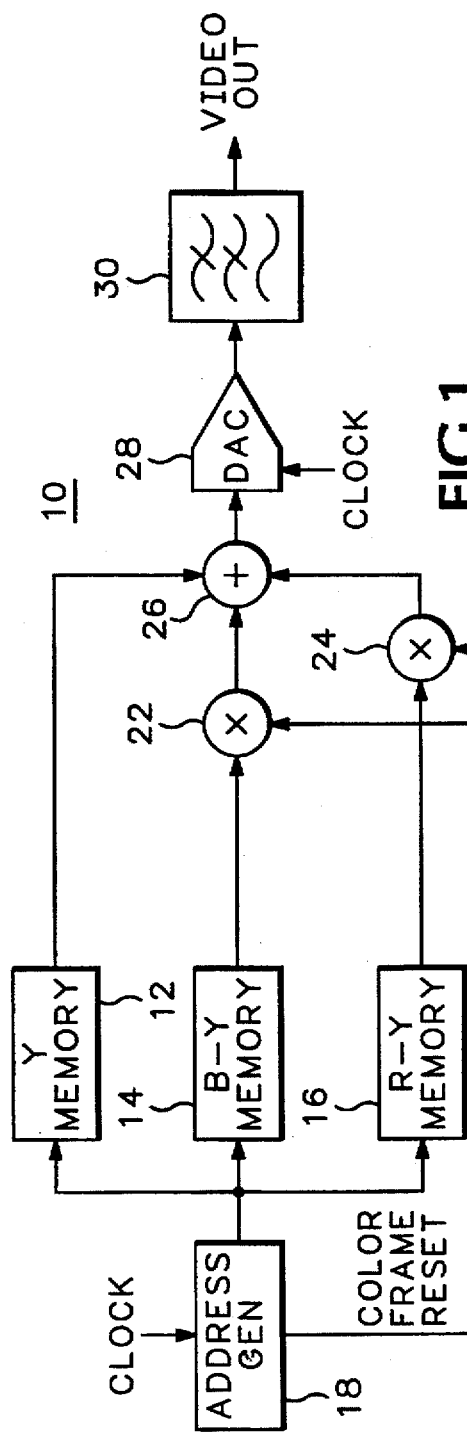
FIG. 1 is a block diagram of a digital test signal generator having SCH phase adjustment according to the present invention.

Referring now to FIG. 1 a digital video test signal generator 10 is shown. Three digital memories 12, 14, 16 are used to store the luminance (Y) and color difference components (B-Y and R-Y). An address generator 18 produces address data from an input clock signal at a rate which is an integer multiple of the video line rate. The address generator 18 also produces a Color Frame Reset pulse which has a width of one clock cycle and occurs once per color frame at the beginning of frame one, line one. The clock signal, Color Frame Reset pulse and an SCH Phase Adjust signal are input to a quadrature Direct Digital Synthesis (DDS) circuit 20 that produces a digital representation of the sine and cosine of the color subcarrier frequency (Fsc). The sine and cosine color subcarrier signals from the DDS circuit 20 are modulated in respective modulators 22, 24 by the color difference components from the color component memories 14, 16. The resulting signals are combined by an adding circuit 26 with the luminance data from the luminance memory 12 to produce a digital representation of the desired composite video test signal. The digital video test signal is then sent through a digital-to-analog converter (DAC) 28 followed by a reconstruction (lowpass) filter 30 to produce the output analog video test signal.

Figure 2:
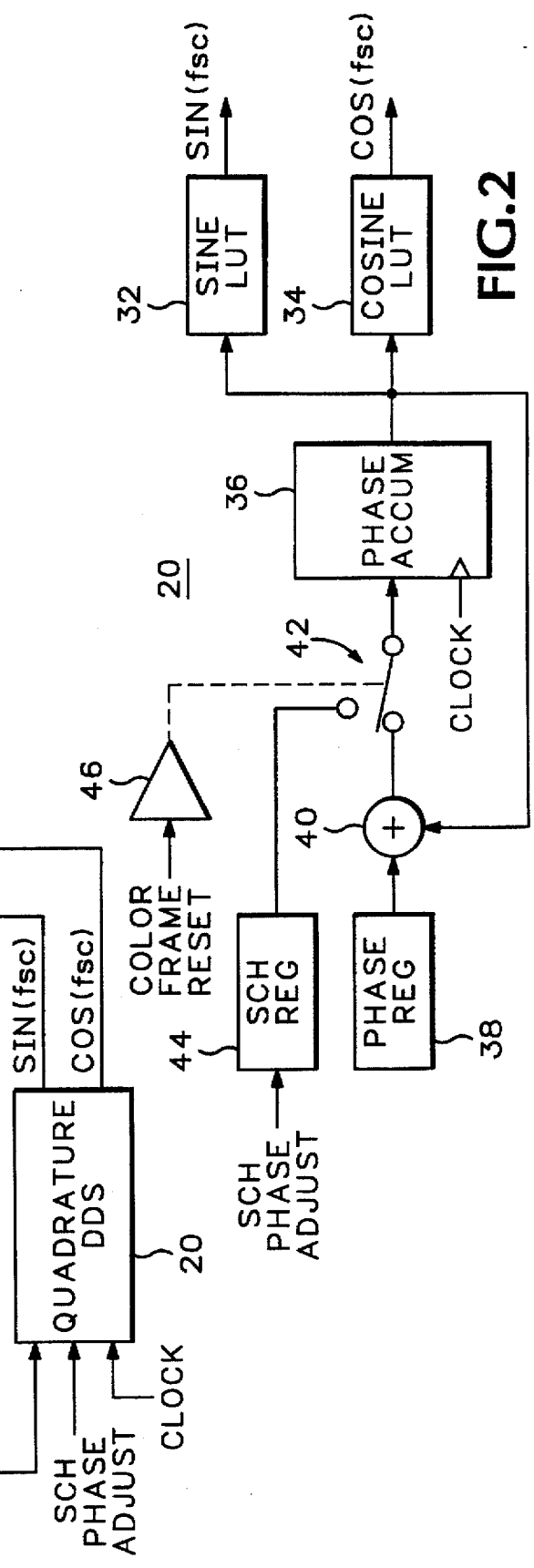
FIG. 2 is a block diagram of a quadrature direct digital signal synthesizer for the test signal generator of FIG. 1 according to the present invention.

The DDS 20, as shown in FIG. 2, has a pair of sine/cosine lookup tables 32, 34 that provide the sine and cosine subcarrier signals, respectively. The lookup tables 32, 34 are addressed by the output of a phase accumulator 36 which is clocked by the clock signal. A phase increment register 38 is loaded with a phase increment value which determines the frequency of the sine/cosine subcarrier signals. An adder 40 combines the output of the phase accumulator 36 with the phase increment from the phase increment register 38 to produce an address that is loaded back into the phase accumulator at the next clock cycle via a switch 42. The SCH Phase Adjust signal loads a desired SCH phase offset into an SCH phase register 44, the output of which is a second input to the switch 42. The switch 4Z is controlled by the Color Frame Reset pulse via a buffer amplifier 46.

In operation at the beginning of each color frame (at frame one, line one) the Color Frame Reset pulse causes the switch 42 to select as input for one clock cycle the SCH phase value from the SCH phase register 44 which initializes the phase accumulator 36 with an SCH phase offset. The SCH phase offset determines the SCH phase in the output test signal, and thus changing the SCH phase value varies the SCH phase in the final output test signal. For the balance of the color frame the switch 4Z couples the phase increment register 38 to the phase accumulator 36 to clock out the sine/cosine subcarrier signals from the lookup tables 32, 34 at the desired frequency.

Thus the present invention provides a controlable, varying SCH phase for a digitally generated test signal by initiating a phase accumulator with an SCH phase offset value at the beginning of each color frame for the output test signal.

What is claimed is:

1. A digital test signal generator of the type that includes means for generating digital sine/cosine subcarrier signals at a desired frequency, means for providing digital chrominance component values and luminance values, and means for modulating the sine/cosine subcarrier signals with the digital chrominance component values and for combining the result with the luminance values to produce a digital test signal further comprising:

means for producing a color frame reset signal once per color frame of the digital test signal; and means for initializing the generating means with a desired SCH phase offset in response to the color frame reset signal.

2. The digital test signal generator as recited in claim 1 wherein the initializing means comprises:

means for storing the desired SCH phase offset; and means in response to the color frame reset signal for inputting the desired SCH phase offset to the generating means as an initial value.

3. A digital test signal generator comprising:

means for storing digital luminance values and a pair of digital color component values representing a desired test signal;

means for generating a pair of quadrature subcarrier signals;

means for modulating the quadrature subcarrier signals with the respective digital color component values and combining the result with the digital luminance values to produce a digital test signal corresponding to the desired test signal;

means for producing a color frame reset pulse once per color frame of the digital test signal; and means for initializing the generating means with an SCH offset value in response to the color frame reset pulse so that the SCH phase of the digital test signal is offset by a desired amount.

4. A method of generating a digital test signal with an adjustable SCH phase comprising the steps of:

storing digital luminance values and a pair of digital color component values representing a desired test signal in respective memories;

generating a pair of quadrature subcarrier signals by direct digital synthesis using a phase accumulator;

modulating the quadrature subcarrier signals with the respective digital color component values from the memories and combining the result with the digital luminance values from the memories to produce the digital test signal;

producing a color frame reset pulse once per color frame of the digital test signal; and initializing the phase accumulator with an adjustable SCH offset value in response to the color frame reset pulse so that the SCH phase of the digital test signal is adjusted as desired.

* * * * *